Jan. 2, 1951
D. E. MILLER
2,536,456
PROCESS OF MAKING A TRI-SODIUM PHOSPHATE
HYPOCHLORITE PRODUCT
Filed Nov. 18, 1946
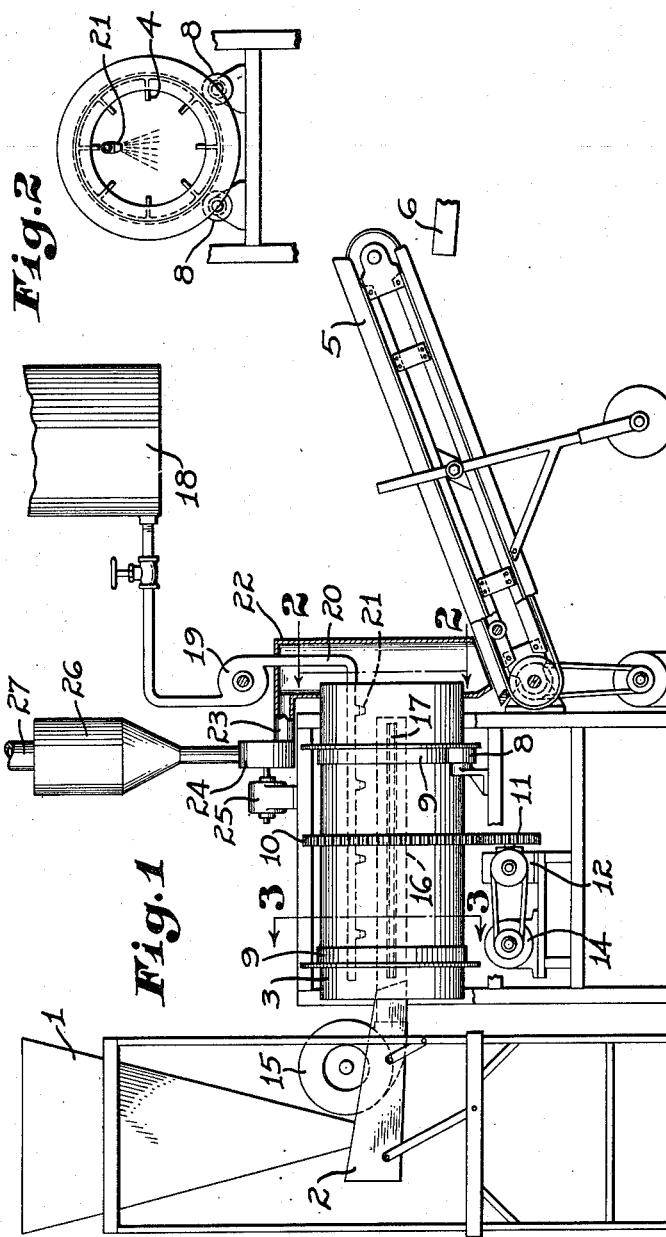
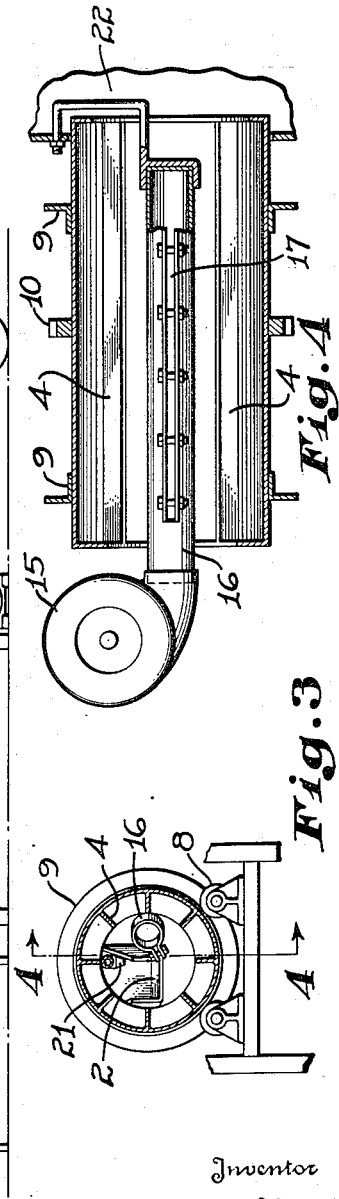
Inventor
Dariel E. Miller
By Lyon & Lyon
Attorneys Patented Jan. 2, 1951

2,536,456

UNITED STATES PATENT OFFICE 2,536,456

PROCESS OF MAKING A TRI-SODIUM PHOSPHATE HYPOCHLORITE PRODUCT

Dariel E. Miller, Los Angeles, Calif., assignor to Kelite Products, Inc., Los Angeles, Calif., a corporation of California Application November 18, 1946, Serial No. 710,478

7 Claims. (Cl. 23—86)

This invention relates to a method and apparatus for making trisodium phosphate hypochlorite compound. Trisodium phosphate hypochlorite has previously been prepared by crystallizing the compound from solution. The compound has contained trisodium phosphate ($Na_3PO_4$) and sodium hypochlorite ($NaOCl$) and water in rather an indefinite ratio but the available chlorine content of the compound obtained was usually between 3 and 4% on a weight basis. Such a product is of considerable value as a germicide and is used, for example, in cleaning dairies, disinfecting dishes, etc.

It is the general object of the present invention to provide an improved method and apparatus for making such a trisodium phosphate hypochlorite compound for general use. The present invention is predicated upon the discovery that the desired T. S. P. hypochlorite compound can be produced by directly spraying a solution of sodium hypochlorite upon finely divided anhydrous trisodium phosphate or partially hydrated trisodium phosphate. When a solution of hypochlorite is sprayed on the trisodium phosphate as described, in place of the trisodium phosphate merely hydrating, there are attached molecules of sodium hypochlorite in addition to some of the molecules of water, and this operation goes on in the method and apparatus of the invention without the solid trisodium phosphate passing into a solution state.

Moreover, the process and apparatus of the present invention is capable of being carried out either as a batch process or as a continuous operation. The process of the present invention has the further advantage that a solid product in the form of a rather free-running aggregate is obtained which has substantially no caking tendency and is ready and easy to dissolve. The product of the present invention does not require any addition thereto of any ingredients to maintain the same free-running.

Furthermore, by the method and apparatus of the present invention, a product is obtained which may, if desired, contain a higher available chlorine content than similar products produced by the methods heretofore in use.

The method and apparatus of the present invention eliminates the necessity, as in previous practices, of handling large volumes of corrosive liquors.

The method and apparatus of the present invention may be carried on as a batch operation, but, preferably, a continuous method and apparatus are utilized. In the method and apparatus of the present invention the trisodium phosphate material is continuously introduced into one end of a rotating drum, from the other end of which the product is continuously discharged.

The sodium hypochlorite solution is continuously sprayed upon the trisodium phosphate while the sodium phosphate is passing through the drum and is picked up and incorporated into the desired product. The reaction occurring is exothermic and it is advisable to remove the developed heat during the reaction. The cooling may be satisfactorily carried out by blowing air through the material during the reaction.

The method and apparatus of the present invention, together with various further objects and advantages of the invention, will be more fully understood from the following description of the preferred form of the invention, which description is given in connection with the accompanying drawings, in which.

Figure 1 is an elevation.

Figure 2 is a fragmentary section, taken substantially on the line 2—2 of Fig. 1.

Figure 3 is a similar section taken on the line 3—3 of Fig. 2.

Figure 4 is a section on the line 4—4 of Fig. 3.

Referring to the drawings, 1 indicates a hopper for holding the supply of dehydrated or partially hydrated trisodium phosphate. Preferably the material is in a finely divided state capable of passing through a 60 mesh screen and mostly through a 200 mesh screen. From the hopper 1 the material is fed continuously by a feeding device, diagrammatically indicated at 2, into the end of the rotating drum 3. The drum 3 is preferably provided with fins 4 for the purpose of assisting in the tumbling of the trisodium phosphate material as the drum rotates. The drum is preferably positioned on a slight slant towards a discharge conveyor 5 which receives the product and delivers it onto the screen 6.

The rotary drum 3 may be mounted in any suitable manner, such as by rolls 8 engaging the tracks 9 for rotation about its axis and may be driven by a gear 10 which in turn engages the gear 11 driven by a reduction member 12 and by a motor 14.

From the left of the drum, as viewed in Fig. 1, air is forced by a blower 15 into an intake 16 having a variable slot 17 by means of which the air is distributed for the purpose of removing the heated reaction.

During the operation the sodium hypochlorite solution is continuously withdrawn from the tank 18 by a pump 19 and passed through a line 20 which enters the drum 3. Within the drum 3 there is provided a plurality of spray nozzles, such as indicated at 21, by means of which the sodium hypochlorite solution is sprayed upon the trisodium phosphate material in the drum.

The strength of the hypochlorite solution should be adjusted so that when the trisodium phosphate has been substantially completely hydrated it contains about 1 to 5% available chlorine. Complete hydration corresponds to about 12 molecules of water of hydration and various strengths of hypochlorite solution may be utilized in the process, depending upon the extent of hydration of the trisodium phosphate at the start of the process.

The product produced by the process of the present invention is of a somewhat granular, free-running nature; less than 20% of the material being retained on a 14 mesh screen while substantially all of the product is retained on a 100 mesh screen.

An important part of the process of the present invention is the feature of continuously cooling the material undergoing reaction. Cooling is generally a necessary part of the process as in the absence of cooling the chlorine may be liberated from the product, or the product may be heated until it is melted into one lump. The cooling is carried out by blowing air into the drum continuously during the operation, the air being discharged from the right end of the drum. At the right end of the drum there is provided the hood 22 having a discharge outlet 23 connected with the fan 24 driven by a motor 25 through a separator 26 and hence to the outlet 27.

While the particular form of the process and apparatus herein described is well adapted for carrying out the objects of the present invention, various modifications and changes may be made, and this invention includes all such modifications and changes that come within the scope of the appended claims.

I claim:

1. A process of making a trisodium phosphate hypochlorite product which comprises spraying upon a partially hydrated solid trisodium phosphate material a solution of sodium hypochlorite and forming the desired product while retaining the trisodium phosphate in the solid state.

2. A process of making a trisodium phosphate hypochlorite product, which comprises spraying on finely divided solid trisodium phosphate, which is incompletely hydrated, a solution of sodium hypochlorite until complete hydration of the sodium phosphate material, thereby producing a product in granular form while retaining the trisodium phosphate in the solid state.

3. A process of making a trisodium phosphate hypochlorite product, which comprises spraying on finely divided trisodium phosphate, which is incompletely hydrated, a solution of sodium hypochlorite until complete hydration of the sodium phosphate material, while maintaining the trisodium phosphate in the solid state while the hydration is being completed and during the reaction removing the excess heat.

4. A process of making a trisodium phosphate hypochlorite product, which comprises spraying on finely divided trisodium phosphate, which is incompletely hydrated, a solution of sodium hypochlorite until complete hydration of the sodium phosphate material, the hypochlorite solution containing sufficient strength to produce a product obtained between one to five per cent available chlorine the solution being added sufficiently slowly so as to retain the trisodium phosphate in the solid state while the hydration operation is being carried out.

5. A process for making a trisodium phosphate hypochlorite compound which process comprises spraying a finely divided trisodium phosphate material, which is incompletely hydrated, with a solution of sodium hypochlorite, the solution of hypochlorite being added at such rate as to retain the trisodium phosphate material in solid state while the same is hydrated with the hypochlorite solution, while cooling the phosphate material undergoing reaction by blowing air thereon.

6. A method of making trisodium phosphate hypochlorite product which comprises, continuously turning and advancing a pile of trisodium phosphate material which is incompletely hydrated, continuously spraying the turning pile of material with a solution of sodium hypochlorite while retaining the pile of material in the solid state.

7. A method of making trisodium phosphate hypochlorite product which comprises, continuously turning and advancing a pile of trisodium phosphate material which is incompletely hydrated, continuously spraying the turning pile of material with a solution of sodium hypochlorite while retaining the pile of material in the solid state, and cooling the pile of material with a stream of air to remove excess heat of reaction.

DARIEL E. MILLER.

REFERENCES CITED

The following references are of record in the file of this patent:

UNITED STATES PATENTS

| Number | Name | Date |
|---|---|---|
| 1,460,621 | Taki | July 3, 1923 |
| 1,862,557 | Wendler | June 14, 1932 |
| 1,879,479 | Punnett | Sept. 27, 1932 |
| 1,965,304 | Adler | July 3, 1934 |
| 1,988,991 | Albertshauser | Jan. 22, 1935 |
| 1,996,769 | Kuehne | Apr. 9, 1935 |
| 2,032,632 | Renschler | Mar. 3, 1936 |
| 2,097,517 | Durgin | Nov. 2, 1937 |
| 2,145,015 | Seaton | Jan. 24, 1939 |
| 2,149,966 | Kniskern | Mar. 7, 1939 |
| 2,157,558 | Muskat | May 9, 1939 |
| 2,356,820 | Cady | Aug. 29, 1944 |
| 2,435,474 | Soule | Feb. 3, 1948 |

FOREIGN PATENTS

| Number | Country | Date |
|---|---|---|
| 274,198 | Great Britain | July 18, 1927 |